United States Patent [19]

Hunter

[11] 3,961,601

[45] June 8, 1976

[54] APPARATUS FOR VIBRATING AND DEWEBBING TIRE CORD FABRIC COATED WITH AN UNDRIED LIQUID

[75] Inventor: Edward E. Hunter, Akron, Ohio

[73] Assignee: The Goodyear Tire & Rubber Company, Akron, Ohio

[22] Filed: July 17, 1975

[21] Appl. No.: 596,703

[52] U.S. Cl. .............................. 118/57; 15/89; 68/19; 118/118
[51] Int. Cl.² ........................................ B05C 11/08
[58] Field of Search ............... 118/57, 114–118, 118/122, 126; 427/346, 347; 15/89; 68/19

[56] References Cited
UNITED STATES PATENTS

| | | | |
|---|---|---|---|
| 2,097,601 | 11/1937 | Potdevin | 118/117 X |
| 2,977,243 | 3/1961 | Meier | 118/117 X |
| 3,186,861 | 6/1965 | Smith et al. | 118/118 X |

*Primary Examiner*—Morris Kaplan
*Attorney, Agent, or Firm*—F. W. Brunner; H. E. Hummer

[57] ABSTRACT

An apparatus for vibrating and dewebbing tire cord fabric treated with a liquid bonding agent for promoting the adhesion between the warp cords of the fabric and the rubbery material in which the cords are embedded. The fabric, freshly coated with the liquid bonding agent, is guided along a desired vertical pathway between a pair of rotating cylindrically shaped cams which are eccentrically mounted for rotation about axes which are equally spaced from the pathway of the fabric. The rotation of the cams is synchronized such that the cams continuously contact the fabric as they alternately push the fabric in opposite directions from the desired pathway to vibrate the fabric between the rotational axes of the cams. Thus, excess liquid coating is shaken from the fabric to help remove any liquid coating webbing the openings between the warp cords and weft threads of the fabric.

15 Claims, 2 Drawing Figures

APPARATUS FOR VIBRATING AND DEWEBBING TIRE CORD FABRIC COATED WITH AN UNDRIED LIQUID

BACKGROUND OF THE INVENTION

The invention is designed to remove excess liquid coating from tire cord fabric immediately after the fabric has been dipped in the liquid coating which includes a bonding agent for promoting the adhesion between the fabric and rubbery material of a tire in which the fabric is later embedded. At present, conventional beater bars are used to periodically strike the fabric to shake off excessive liquid coating and deweb the fabric, i.e. removing liquid coating webbing the openings between the warp cords and weft threads of the fabric. The beater bars are positioned on opposite sides of the fabric and rotated or reciprocated into an out of contact with the fabric. It has been found that the beater bars cause distortion of the weft threads as they strike the fabric. Moreover, the beater bars sometimes break the weft threads which can produce a distortion in the pathway of the warp cords. In either case, a distortion or breaking of the weft threads adversely affects the dimensional stability of the woven fabric. The invention is designed to solve this problem by the provision of a vibration device which continuously contacts the fabric rather than occasionally beating or striking it with a force sufficient to distort or break the weft threads.

Briefly state, the invention is in an apparatus for vibrating and dewebbing fabric coated with an undried liquid. The apparatus is provided with means for guiding a sheet of fabric along a desired pathway which is angularly disposed to the horizontal. The pathway of the fabric leads between a pair of elongated cams which are spaced from each other in both vertical and horizontal directions. The length of each cam is at least coextensive with the width of the fabric. Means are supplied for mounting the cams for rotation about parallel axes which in turn are parallel to the desired pathway of the fabric. Means are furnished for positioning the cams such that their rotational axes are equally spaced in opposite directions from the desired pathway of the fabric. Further, means are provided for synchronizing rotation of the cams such that the cams continuously contact the fabric as they alternately push the fabric in opposite directions from the desired pathway to vibrate the fabric between their rotational axes.

DESCRIPTION OF THE DRAWING

The following descripton of the invention will be better understood by having reference to the annexed drawing, wherein.

DESCRIPTION OF THE INVENTION

Figures 1, 2:
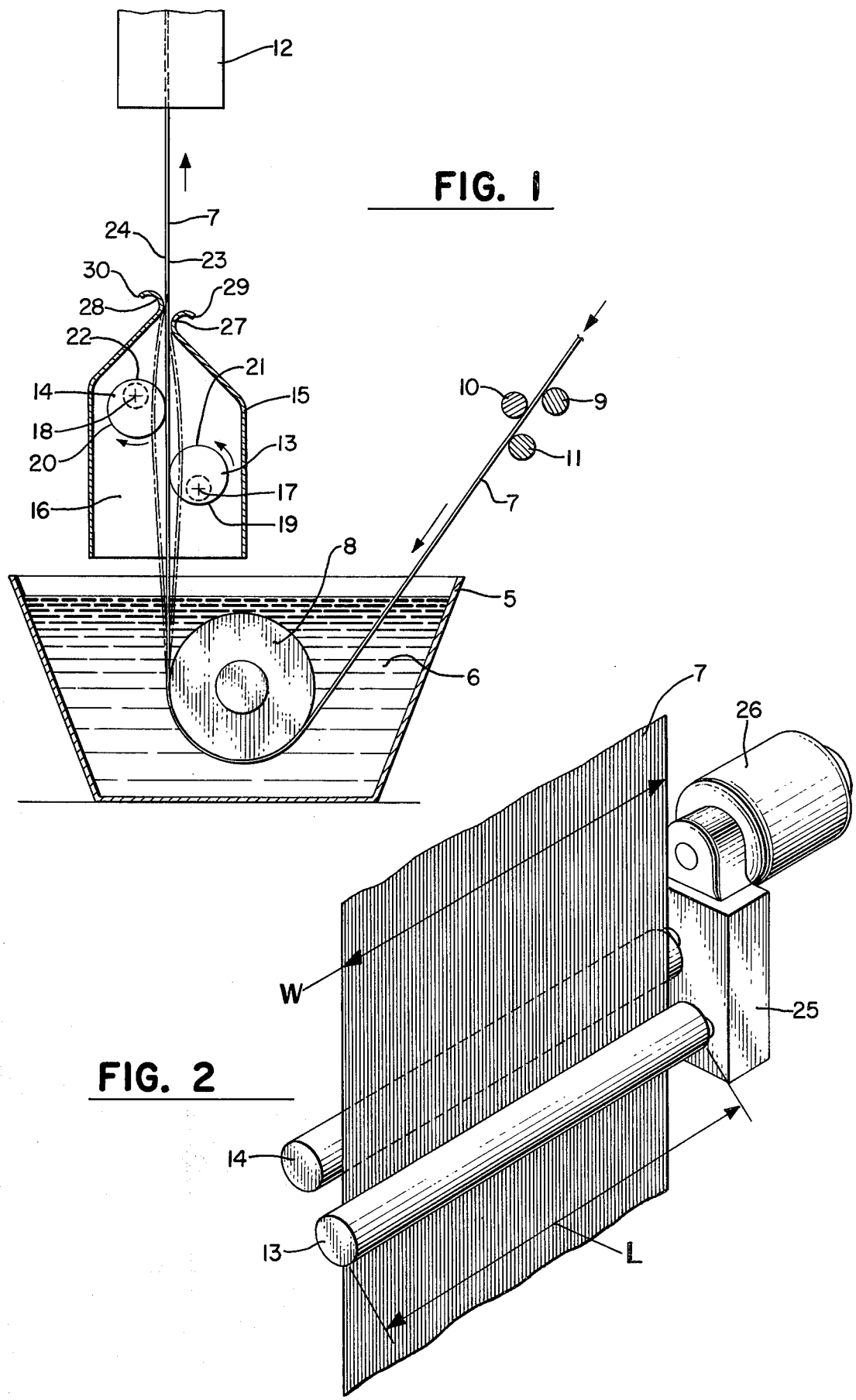
FIG. 1 is a cross-secton of a dip tank and apparatus for vibrating and dewebbing fabric in accordance with the invention.
FIG. 2 is a perspective view of the apparatus.

Referring generally to the drawing and more particularly to FIG. 1, there is shown a dip tank 5 containing a liquid coating 6 comprising a bonding agent for promoting the adhesion between warp cords of a tire cord fabric 7 and rubbery material of a tire in which the fabric 7 is later embedded. The tire cord fabric 7 is directed into the liquid coating 6 within the dip tank 5 by a rotatable applicator drum 8 which is submerged in the liquid coating 6. The tire cord fabric 7, prior to being dipped in the liquid coating 6, passes between a number of spreader rolls 9-11 which engage and distort the warp cords to spread the strands or fibers of the cords for better penentration by the liquid coating 6. The tire cord fabric 7 moves upwardly from the dip tank 5 in a desired pathway which is angularly disposed to the horizontal, i.e. in a substantially vertical plane. The liquid coated fabric 7 is moved into and through an overhead oven 12, wherein the liquid coating is dried on the fabric 7. The tire cord fabric 7, immediately after leaving the dip tank 5 and prior to entry into the overhead oven 12, passes between a pair of rotatable cams 13 and 14 which are designed to shake excess liquid coating 6 from the fabric 7.

The cams 13 and 14 are concealed in a housing 15 for directing liquid coating 6, shaken from the fabric 7, back into the dip tank 5. Thus, the housing 15, in effect, forms a splash chamber 16 in which the cams 13 and 14 rotate. The length L of each cam 13, 14 (FIG. 5) is coextensive with the width W of the tire cord fabric 7. The cams 13 and 14, in this instance, are cylindrically shaped and eccentrically mounted for rotation about parallel axes 17 and 18, respectively, which are parallel to the longitudinal axes of the cams and equally spaced in opposite directions from the desired pathway of the tire cord fabric 7 upon leaving the dip tank 5. The outer cylindrical surfaces 19 and 20 of the cams 13 and 14, are composed of stainless steel. As best seen from the arrows in FIG. 1, the cams 13 and 14 are designed to rotate in opposite directions which, in turn, are opposed to the direction that the tire cord fabric 7 moves through the splash chamber 16 past the cams 13 and 14. The cams 13 and 14 are spaced vertically apart to permit the passage of fabric splices past the cams 13 and 14, since such splices could become trapped between the cams 13 and 14, if they were in the horizontal plane. The cams 13 and 14 are positioned such that their rotational axes 17 and 18 are equally spaced from the aforementioned desired pathway of the fabric 7. The rotation of the cams 13 and 14 are synchronized such that they continuously contact the fabric 7, as they alternately push the fabric 7 in opposite directions from its desired pathway to vibrate or shake the fabric 7 between their rotational axes 17 and 18. The advantages of maintaining the cams 13 and 14 in contact with the fabric 7 are threefold. Firstly, the fabric 7 is not left to vibrate freely within the splash chamber 16, i.e. the amplitude of vibration is controlled by the cams 13 and 14 engagement with the fabric 7. Secondly, the cams 13 and 14 do not periodically strike the fabric 7 to distort or break the warp cords and, thirdly, the outer surfaces 19 and 20 of the cams 13 and 14, are kept moist or wet by the liquid coating 6 to prevent the build-up of dried coating on the cam surfaces 19 and 20. The rotation of the cams 13 and 14 are well synchronized when, for example, the portion 21 of the outer surface 19 of cam 13 farthest from the rotational axis 17 and the portion 22 of the outer surface 20 of cam 14 closest the rotational axis 18, simultaneously contact the opposing sides 23 and 24 of the fabric 7. The cams 13 and 14, as best seen in FIG. 2, are conventionally geared together for unitary rotation in any suitable gearing arrangement in gear box 25 and rotated by any appropriate electric motor 26 which is coupled to the gearing arrangement. The cams 13 and 14 are preferably rotated at a speed in the range of from 500 to 5000 revolutions per minute (RPM).

A pair of curved scraper blades 27 and 28 are formed in the outer free ends 29 and 30 of the housing 15 farthest from the dip tank 5, to contact the fabric as it leaves the splash chamber 16, and help remove any excess liquid coating 6 from the fabric 7. The width of the scraper blades 27 and 28 are also at least coextensive with the width W of the fabric 7.

Although not shown, the cams 13 and 14 may be ellipsoids, i.e. have elliptical cross-sections taken normal to their rotational axes 17 and 18. In such cases, the elliptical shaped cams 13 and 14 are mounted for rotation about their longitudinal axes which are at the intersection of planes containing the major and minor axes of the ellipsoid, or elliptical sections. In any case, it is desired to make the outer surfaces 19 and 20 of the cams 13 and 14 curved in such a way that the cams 13 and 14 will continuously engage or contact the fabric 7 while moving the fabric 7 from side-to-side, rather than periodically strike the fabric 7 for the purpose of shaking the fabric 7 to remove any excess liquid coating 6.

Thus, there has been provided a highly improved apparatus for shaking tire cord fabric which has been freshly treated with a liquid coating material, to remove any excess liquid coating, thereby helping deweb the fabric, since webbing of the pores of the fabric by dried liquid coating adversely affects the penetration and bond between the fabric and rubbery material in which the fabric is embedded. The cam surfaces can be suitably curved to be in continuous contact with the fabric at intervals which are sufficiently spaced to allow the passage of splices past the cams.

What is claimed is:

1. An apparatus for shaking fabric coated with an undried liquid, comprising in combination:
   a. means for guiding a sheet of fabric along a desired pathway which is angularly disposed to the horizontal;
   b. a pair of elongated cams disposed in spaced relation, the length of each cam being at least coextensive with the width of the fabric;
   c. means for mounting the cams for rotation about parallel axes which are parallel to the desired pathway of the fabric and spaced apart both in horizontal and vertical directions;
   d. means for positioning the cams such that their rotational axes are equally spaced in opposite directions from the desired pathway of the fabric; and
   e. means fo synchronizing rotation of the cams such that
      I. the outer surface farthest from the rotational axis of one of the cams and the outer surface closest to the rotational axis of the other of the cams, simultaneously contact the fabric and
      II. the cams continuously contact the fabric as they alternately push the fabric in opposite directions from the desired pathway, thereby vibrating or shaking the fabric between the rotational axes of the cams.

2. The apparatus of claim 1, wherein each of the cams is cylindrical, and the rotational axis of each cam is eccentric in relation to the longitudinal axis of the cam.

3. The apparatus of claim 1, wherein the fabric contacting surfaces of the cams are composed of stainless steel.

4. The apparatus of claim 1, wherein the cams are rotated, in unison, in opposite directions at from 500 to 5000 revolutions per minute.

5. The apparatus of claim 1, which includes a housing surrounding the cams for containing liquid coating shaken from the fabric.

6. The apparatus of claim 1, wherein the housing includes a pair of curved scraper blades for contacting opposing sides of the fabric in vertically spaced relation.

7. The apparatus of claim 1, wherein each of the cams has an elliptical cross-section taken in a plane normal to the longitudinal axis of the cam.

8. The appartus of claim 7, wherein the rotational axis of each cam coincides with the longitudinal axis of the cam, the longitudinal axes being at the intersection of planes containing the major and minor axes of the elliptically shaped cams.

9. The apparatus of claim 8, wherein the fabric contacting surfaces of the cams are composed of stainless steel.

10. In combination:
   a. a dip tank containing a liquid coating including a bonding agent for promoting the bond between fabric and rubbery material in which the fabric is embedded;
   b. means for directing a sheet of fabric into the liquid coating in the dip tank;
   c. means for guiding the fabric from the dip tank in a desired pathway which is angularly disposed to the horizontal;
   d. an elongated cam positioned on either side of the desired pathway of the fabric immediately above the dip tank, the cams being spaced apart both in a vertical and horizontal direction;
   e. means for mounting the cams for rotation about parallel axes which parallel the desired pathway of the fabric;
   f. means for positioning the cams such that the rotational axes thereof are equally spaced from the desired pathway of the fabric; and
   g. means for synchronizing rotation of the cams such that
      I. the outer surface farthest from the rotational axis of one of the cams and the outer surface closest to the rotational axis of the other of the cams, simultaneously contact the fabric and
      II. the cams continuously contact the fabric as they push the fabric in opposite directions from the desired pathway of the cord, thereby vibrating the fabric between the rotational axes of the cams.

11. The combination of claim 10, wherein each of the cams is cylindrical and eccentrically mounted for rotation about a rotational axis which parallels the longitudinal axis thereof.

12. The combination of claim 11, which includes a housing at least partially surrounding the cams for directing liquid coating shaken from the fabric back into the dip tank.

13. The combination of claim 12, wherein the housing includes a pair of curved scraper blades for contacting opposing sides of the fabric, the width of each scraper blade being at least coextensive with the width of the fabric.

14. The combination of claim 12, wherein the outer cylindrical surfaces of the cams are composed of stainless steel.

15. The combination of claim 12, wherein the cams are rotated, in unison, in opposite directions which are opposed to the direction in which the fabric moves past the cams.

* * * * *